Figure 1:
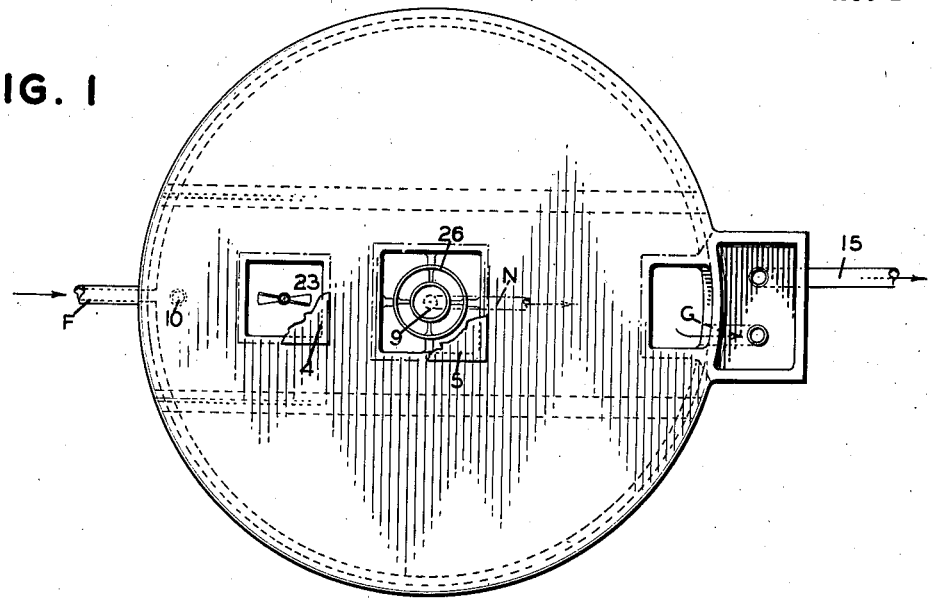

April 2, 1940.  F. A. DOWNES  2,195,408
SEWAGE DIGESTION
Original Filed Nov. 16, 1935   3 Sheets-Sheet 1

INVENTOR.
FRANK A. DOWNES
BY
ATTORNEY.

April 2, 1940.　　　　F. A. DOWNES　　　　2,195,408
SEWAGE DIGESTION
Original Filed Nov. 16, 1935　　　3 Sheets—Sheet 2

INVENTOR.
FRANK A. DOWNES
BY Arthur Middleton
ATTORNEY.

April 2, 1940.　　　F. A. DOWNES　　　2,195,408
SEWAGE DIGESTION
Original Filed Nov. 16, 1935　　3 Sheets-Sheet 3

INVENTOR.
FRANK A. DOWNES
BY
ATTORNEY.

Patented Apr. 2, 1940

2,195,408

UNITED STATES PATENT OFFICE 2,195,408

SEWAGE DIGESTION

Frank A. Downes, Larchmont, N. Y., assignor to The Dorr Company, Inc., New York, N. Y., a corporation of Delaware Application November 16, 1935, Serial No. 50,130
Renewed June 24, 1939

7 Claims. (Cl. 210—2)

The invention hereof relates to systems involving the multi-stage digestion of sludge derived as the result of subjecting sewage and other polluted waters to sedimentation, as for example, waters containing solids incident to industrial or trade wastes and constituting impurities in the water.

Apparatus for treating such sludge by the multi-stage digestion process is old. In the U. S. Patent to Fischer and Lund No. 1,989,589 granted January 29, 1935, there is described in considerable detail a multi-digestion process according to which bacteriological digestion is carried out in a multiplicity of stages, to wit, in what has been referred to as an initial or primary stage, and a subsequent or secondary stage. Each of these digestion stages as described in said patent is accompanied by the production of combustible gas consisting largely of methane ($CH_4$) which is collected in a relatively large gasholder that is associated with the subsequent or second stage digester of said patent. According to the arrangement shown in said patent the primary and secondary digesters, or as otherwise expressed, the initial and subsequent digesters, are arranged side by side and are operatively connected through a pipe or conduit construction whereby they operate as a set. According to the arrangement of said Fischer et al patent, the primary and secondary digesters thereof are located so that during most of the normal operation of the apparatus the fluid bodies in the digesters are at the same level or substantially so.

According to the present invention a multi-stage digestion system or process is contemplated, which revolves about the devising and employing of a type of digester construction, having one or more of the following features:

(a) In which incoming sludge enters an initial zone wherein a body of bacteriological digesting sludge, when once established, is maintained, (b) In which by suitable means provided therefor there is an effective mixing or dispersion of entering fresh sludge in and throughout the body of bacteriological digesting sludge whereby bacteriological digestion of the solid content of the freshly introduced sludge is readily initiated as a consequence of the effective exposing of such solids to the sludge already undergoing the initial stage of bacteriological digestion, and by which mixing means the contents of the initial stage are rendered homogeneous so that when a quantity thereof is displaced from that stage the constituents thereof are in about the same proportion as in the stage proper, (c) In which, incident to the feeding of fresh or incoming sludge, there is a consequent displacement and downward passage of sludge from the initial zone into a subsequent zone wherein a body of sludge undergoing a second or subsequent stage of bacteriological digestion is maintained, (d) In which the combustible gas given off during the second stage of bacteriological digestion is passed upwardly from the high section of the subsequent zone either into or through the body of sludge in the initial zone, and ultimately into a gas receiving space to and immediately over the body of sludge in the initial zone, or as otherwise expressed, to and into a gas receiving space at the under or nether portion of the top of the digester, with the result that the gas from both the initial and subsequent digestion stages or zones is collected in a common gas receiving space, and (e) In which an overflow pipe or conduit construction leading from the interior portion of the subsequent zone—preferably leading from the upper interior portion of the subsequent zone—is provided so that incident to the feeding of sludge into the initial zone there is a displacement of a corresponding or equal amount of sludge—preferably the supernatant of the sludge—within the subsequent zone towards and ultimately past an overflow section that is relied upon to determine the normal level of the sludge body maintained in the initial zone.

(f) And in which an auxiliary normally closed sludge escape means is provided from the initial digestion zone that is controlled by a relief valve to be closed thereby except when abnormal conditions cause a substantial pressure differential on opposite sides of the valve.

An object of the invention is to devise a practical apparatus, system or process according to which multi-stage digestion can be realized and practically carried out with the requisite digestion zones in superposed arrangement whereby only a relatively small ground area for such a plant is necessary, and whereby only a minimum amount of structural material will be required.

Another object of the invention is to provide an arrangement which will avoid the employment of a large number of pipes or conduits which are otherwise essential in a multi-stage digestion system wherein the primary and secondary digestion zones are provided in separate digesters that are arranged side by side.

A further object of the present invention is to provide a construction whereby an automatic unloading by the transfer of sludge from the upper zone into the lower zone will take place should, for example, there be an undue and unwarranted withdrawal of sludge from the lower zone incident to mal-operation. In other words, an arrangement is provided having in view the preventing of a collapse or failure of the relatively light diaphragm should an operator through inadvertence withdraw an excessive amount of sludge from the lower zone, to wit, to an extent whereby the buoyant supporting effect at the underside of the diaphragm of the lower body of sludge is removed or eliminated.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

Figure 3:
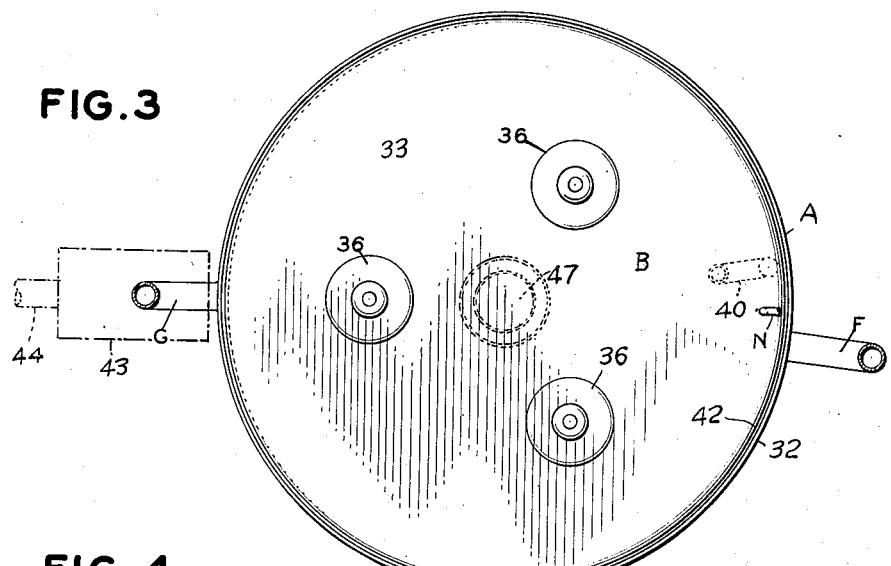
Figure 4:
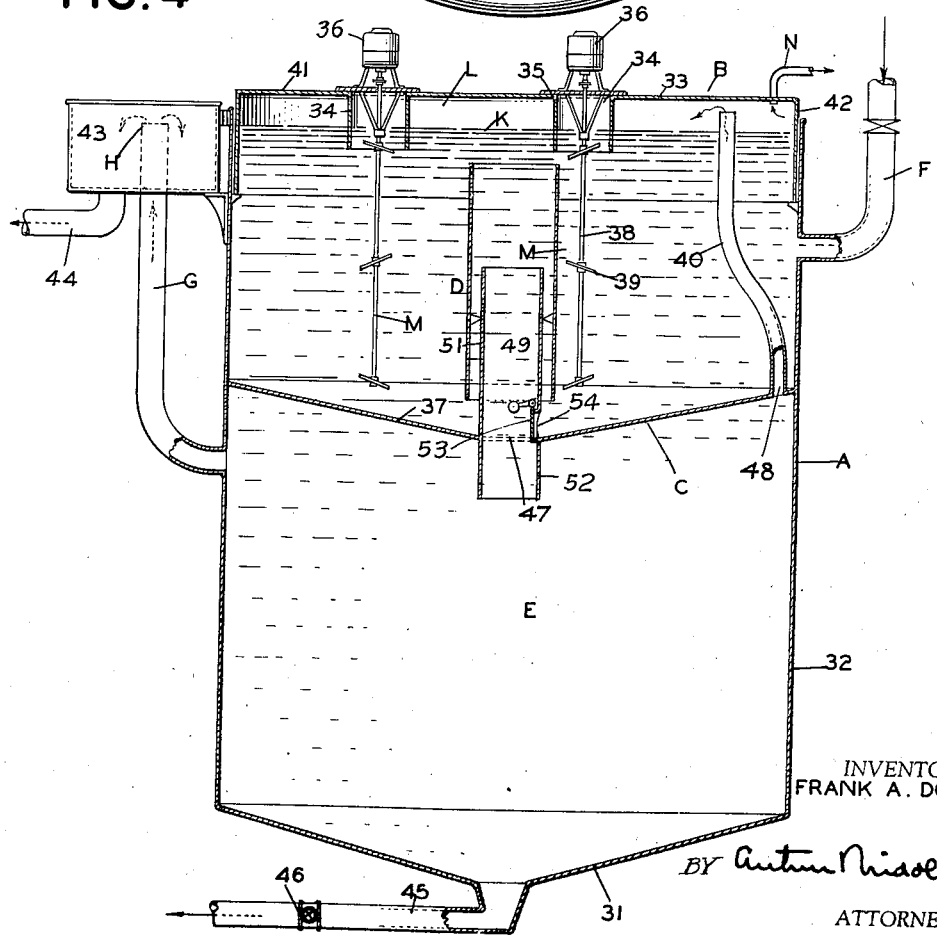
Figure 5:
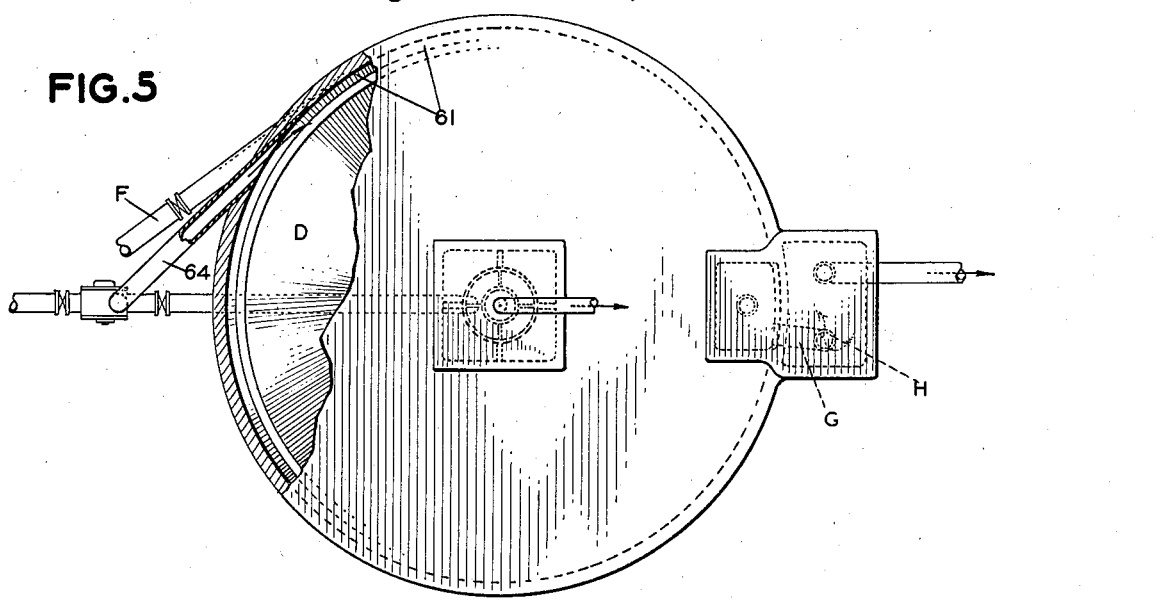
Figure 6:
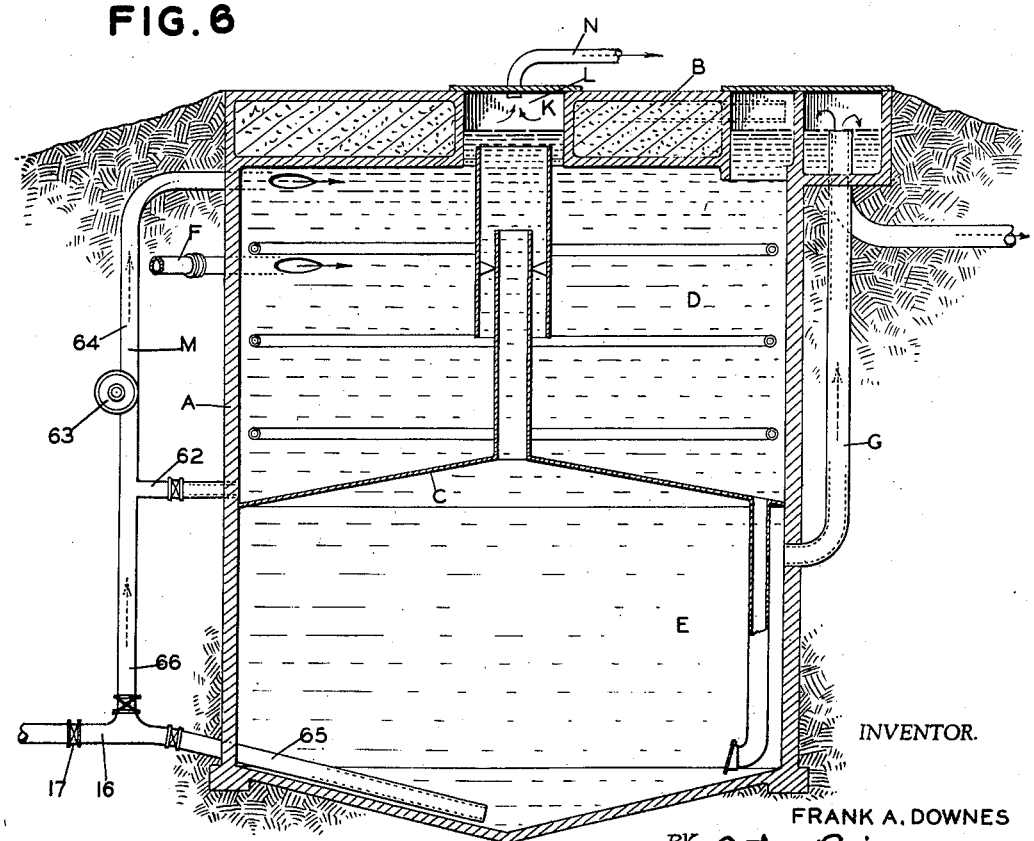

The novel features considered characteristic of my invention are set forth with particularity in the appended claims. The invention itself, however, both as to its organization and its method of operation, together with additional objects and advantages thereof, will be best understood from the following description of a specific embodiment when read in connection with the accompanying drawings, in which Figs. 1 and 2 are respectively a plan view and a vertical sectional view of one form of multi-stage digester in which the digestion zones are in superposed relationship;

Figs. 3 and 4 are respectively a plan view and a vertical sectional view of another form of multi-stage digester, in which the digestion zones are in superposed relationship; and Figs. 5 and 6 are respectively a plan view, partially in section, and a vertical sectional view of a further form of multi-stage digester in which the digestion zones are in superposed relationship.

Reference will now be made to the drawings in detail.

Figure 2:
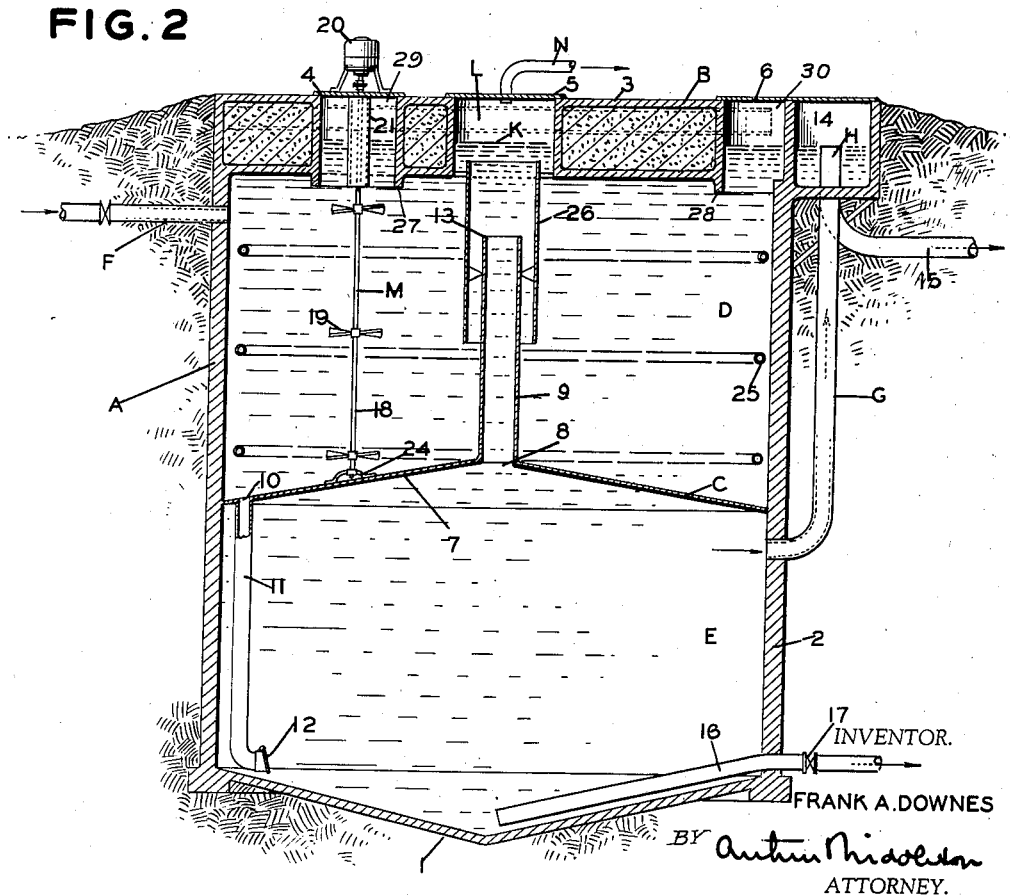

As between the forms of construction shown in the drawings, the arrangement of Figs. 1 and 2 and the arrangement of Figs. 5 and 6 each has certain tank features which are preferable as compared with the tank features of the arrangement shown in Figs. 3 and 4.

In each form shown there is a digester tank, collectively designated as A, having a relatively closed top at B. The digester is divided by a transversely extending disc-like partition diaphragm or tray C into an upper and a lower sludge digesting zone or section D and E. D represents an initial or primary digestion zone while E represents a subsequent or secondary digestion zone. Fresh sludge is introduced into the upper zone D through the supply pipe or conduit F. Incident to the introduction of sludge through the pipe F, there is a displacement of a like or corresponding quantity or amount of sludge from the upper zone D into the lower zone E, also a corresponding or like displacement of supernatant liquor from the lower zone E through the outflow pipe or conduit construction G, having an overflow section H, or high point that determines the general liquid level K within the digester A.

Each form of apparatus has a gas receiving space L provided immediately above the body of sludge in the upper zone, and provision is made whereby gas generated in the lower section is caused to pass upwardly and ultimately into the gas receiving space L just mentioned, whereby gases resulting from both stages of digestion are initially received in this receiving space which is in effect common to both of the digestion zones.

The digester is provided with means M for insuring or effecting an intimate mixing and dispersion of freshly introduced sludge in and throughout the body of sludge in the upper zone. The mixing keeps the contents of the zone D homogeneous and not stratified so that when a quantity of the contents is displaced from that zone the displaced quantity comprises a fair average sample of the contents of the zone in so far as proportion of constituents are concerned. If a quantity were displaced while the contents of the zone were stratified in accordance with the relative specific gravity of the constituents thereof the displaced quantity naturally would not comprise a fair average sample thereof. Each form of apparatus is preferably provided with means N whereby gas can be withdrawn, conducted, or allowed to pass from the said receiving zone, thus affording provision whereby the desired continuity of operation, when once established, can be continued within the digesters.

*Arrangement of Figs. 1 and 2*

In the arrangement of these figures, the tank is shown as constructed of any suitable material, for example, concrete. It has a bottom 1, upstanding marginal walls 2, and a roof construction which comprises the fixed portions 3 which are rigidly connected to the boundary walls 2 thus completing a relatively tight structure, except for such openings as are necessary to afford access to the interior of the tank or which are useful in the installing of the structural features embodied interiorly thereof. The openings just referred to are of course closed by suitable cover plates indicated, for example, by members 4, 5 and 6. The transverse partition C heretofore referred to is provided by a cone-shaped member 7 built in place so as to form a relatively tight construction as between the upper and lower chambers D and E, except for the openings or passageways hereinafter referred to.

The upper or central section of this cone-shaped diaphragm is provided with an opening at 8, and upwardly from this central section there extends a pipe or conduit 9, (a) which affords constant communication between the upper zone D and the lower zone E, and (b) which, because of leading upwardly from the highest section of the underside of the cone, serves as a conduit or passageway through which gases generated as the result of the digestion carried out in the lower zone, can pass upwardly into the body of sludge within the upper zone and thence ultimately into the gas receiving space L, and into which gas receiving space it will be noted the gas generated as the result of the digestion carried out in the upper zone, also collects.

It is to be noted that the gas space L may be described as located at the nether or underside of the top or cover member of the digester, and as being immediately above the body of sludge within the upper zone, or as otherwise expressed, as being defined as to its lowermost limits by the upper surface of the body of sludge in the upper zone.

This cone-shaped member 7 also has another opening 10 and a pipe 11 which extends downwardly therefrom. This opening 10 and pipe 11 serve as a normally closed sludge escape means for draining the upper zone in case the digester as a whole is to be emptied, or for permitting the passage of sludge from the upper zone into the lower zone particularly incident to a drop in liquid level in the upper zone to below the general elevation as defined by the upper end 13 of the pipe or conduit 9.

The pipe 11 is normally closed by a valve 12 located at the lower end thereof. This valve 12 may be viewed as a relief valve since its sole function is to allow the passage of sludge from the upper zone D into the lower zone E incident to an abnormal lowering of sludge within the digester.

In the normal operation from day to day, there is the intermittent feeding of sludge through the supply conduit F and a consequent passage of supernatant from the lower body of sludge E through the outflow pipe or conduit construction G, thence over the overflow H thereof, to and into a trough 14 from which the overflowed sludge—to wit, the overflowed supernatant, passes to a point or place of disposal thereof through the outflow pipe or conduit 15.

In the normal operation of the digester, inert solids tend to settle and collect at the bottom of the digester and such settled solids are hydraulically withdrawn—at relatively infrequent times—through the sludge offtake or withdrawal conduit 16 which is normally closed by the valve 17.

The pipe 11 and the relief valve 12 have been incorporated to take care of abnormal conditions should an operator tend to withdraw too much sludge from the lower zone E, for example, should an operator withdraw sufficient sludge from the lower zone E so that the sludge left therein could not afford buoyant support to the cone-shaped diaphragm member C, to wit, to the cone-shaped member 7 thereof. If this buoyant support from the lower body were removed, an enormous load would be placed upon the diaphragm due to the body of sludge entrapped therein. It is primarily to take care of this and to avoid damage from such operation that the pipe 11 and the relief valve 12 has been provided.

The mixing means M heretofore referred to can be constructed in any suitable manner. As shown, it embodies a vertically extending shaft 18 carrying impellers 19. This shaft is operated through the instrumentality of any suitable type of motor, indicated at 20 and carried on the cap or plate member 4 heretofore mentioned. The shaft is surrounded by a tubular portion 21 that continuously dips into the body of sludge maintained within the upper zone, thus substantially providing a liquid seal that prevents the escape of gas upwardly past the rotatable shaft 18.

The top construction of the digester is such as to provide a pocket or access opening 23 which is of sufficient size to allow the ready removal or replacement of the mixing mechanism M just described.

As the top construction is fixed, it is feasible to employ a steady bearing at 24 for the lower end of the shaft 18. At times, particularly in extremely cold weather, it is desirable to heat the sludge in the upper zone, and to that end heating coils are indicated at 25.

A centrally disposed annular section or member 26 is provided in assembled relationship in respect to the upper portion of the pipe or conduit 9. This annular member 26 is in fact a tubular construction of substantial vertical extent and is provided to prevent a direct short-circuiting of the incoming sludge that is supplied through the conduit F to and into the upper end of conduit 9. This member 26 has a considerable extent downwardly along and parallel to the upper portion of the tube or conduit 9, with the result that the sludge which passes from the upper zone D into the lower zone E is mostly derived from the sludge in the lower section of the upper zone D. This tubular member 26 also serves to aid in confining the gas flow passageways leading from the lower zone upwardly towards and into the gas receiving space L. To a substantial extent, the tube or conduit section 9 and the surrounding tube or annular member 26 serve to functionally separate the upper and lower bodies of digesting sludge, and this even though said bodies are in constant communication through a passageway provided by the opening 8 and the tubular or conduit member 9. Depending gas sealing lips are respectively provided at 27 and 28 around the lower marginal edge portion of the normally closed cover openings 29 and 30.

Arrangement of Figs. 3 and 4

According to this arrangement the digester structure comprises a tank having a bottom 31, boundary side walls 32 and a gasometer type of top 33. This gasometer top 33 permits of certain vertical displacement to take care of a variable amount of gas received therein and collected thereby, but it is sufficiently large to in effect provide a gas tight construction for the digester as a whole. This gasometer top has openings 34 normally covered by a cover plate 35, upon which the motor 36 is supported and which in turn drives a shaft 38 and impellers 39 carried on the shaft.

In this arrangement three sets of mixing mechanisms M are illustrated, each of which embodies the motor shaft and impeller construction just mentioned.

The digester is divided into upper and lower zones by the inverted cone-shaped partition member 37, which in effect constitutes the diaphragm C heretofore referred to. The lower central portion of this member 37 has an opening or opening section 47. The member 37 carries or embodies a centrally disposed pipe or conduit 49 that includes a section 51 which extends upwardly from the open section of the member 37 and a section 52 that extends downwardly from the open section of the member 37 whereby there exists a relatively small but constant communication or passageway between the upper zone D and the lower zone E. This partition 37 also has an opening 48 leading from the high section immediately therebelow, and therefrom there extends upwardly a pipe 40. The opening 48 and the pipe 40 constitutes means providing a passageway by which gas generated at the lower zone is passed upwardly and ultimately into the gas receiving space L, which gas receiving space L may be defined as being located at the underside of the top 33 below the horizontal plate portion 41 thereof and within the depending peripheral flange portion 42 thereof and which is immediately above the body of sludge in said upper zone.

The pipe 40 may extend upwardly through the entire body of sludge within the zone D, or it is feasible that this pipe terminates below the top surface of the sludge body normally maintained in the upper zone.

The centrally disposed open section 47 of the partition 37 and the pipe or conduit 49 just referred to may be considered as constituting a passageway means which affords constant communication between the upper zone D and the lower zone E. This passageway means is relied upon to permit the passage of sludge displaced—as a consequence of the feeding of sludge to the upper zone—downwardly into the body of sludge in the lower zone E. The upper end of the upwardly extending section 51 of the pipe or conduit 49 is sufficiently above the portion 37 to avoid a direct passage or short-circuiting of settling or settled solids from the upper zone into the lower zone while the depending section 52 provides a depending gas sealing lip for more completely avoiding an upflow of gas from the lower zone through the pipe 51 within the upper zone. Because of the fact that the partition 37 is of inverted cone shape, it would be feasible to omit the depending section 52 if one desired to do so.

In order to prevent an undue overloading on the partition, for example, as due to improper operation incident to sludge withdrawal, a normally closed sludge relief or escape construction is provided at 53. This relief valve can open to allow a direct sludge flow from the lowermost portion of the upper zone through the opening 54 into the lower zone.

The overflow conduit or pipe construction G leads from the uppermost section of the lower zone E with the result that incident to the feeding of sludge into the upper zone D there is displacement of sludge—supernatant of the sludge—from the lower zone E whereby a relatively clear liquid effluent passes outwardly over the overflow H into a receiving trough 43 from which it passes to the discharge conduit 44 to any suitable place of disposal therefor. The digester is provided with a withdrawal section at 45 from which there extends the valve control conduit 46 which can be relied upon for effecting a withdrawal of settled solids as and when required.

*Arrangement of Figs. 5 and 6*

In the arrangement of these figures the tank and general features of construction are substantially the same as those of Figs. 1 and 2, and the essential differences between the two arrangements just mentioned reside (a) in the mode of introducing the incoming sludge into the upper zone, to wit through the pipe F, and (b) in the means M for insuring or effecting an intimate mixing and dispersion of freshly introduced sludge in and throughout the body of sludge in the upper zone D.

In the arrangement of Figs. 1 and 2 the sludge feed pipe F is shown as delivering the incoming material along a radially extending path into the body of sludge in the upper zone D, whereas in the arrangement of Figs. 5 and 6 the incoming sludge is delivered tangentially as, at and along the path 61 into the body of sludge in the upper zone whereby a tangential or gyratory force action is imparted to the body of sludge and with a consequent relatively effective diffusion and dispersion of the incoming sludge in and throughout certain sections of the sludge body. In other words, this tangential mode of sludge delivery is of itself more effective in obtaining diffusive and dispersive results than is the radial mode of infeed.

As to the mixing means M of the two forms under construction, it will be noted that according to the arrangement of Figs. 1 and 2 the mixing within the upper zone is entirely internally effected by agitative elements located within the zone. According to the arrangement of Figs. 5 and 6 an external pumping device is employed comprising a valve inlet branch 62 leading from the lower interior portion of the upper zone to the pump 63 from which there extends a delivery pipe 64 leading into the upper interior portion of the upper zone. With the valve in the inlet branch 62 open, the pump 63 can be relied upon to create a circulatory effect by withdrawing sludge from the lower interior portion of the upper zone and by passing the thus pumped sludge into the upper interior portion with the consequent result that there is obtained an intimate mixing and dispersion of the incoming or recently introduced sludge within and throughout the body of sludge. An inspection of Fig. 5 discloses the fact that the delivery pipe 64 provides a tangential delivery of the return sludge whereby the advantage of the tangential and gyratory effect of such delivery can be also availed of.

The agitating means M of Figs. 5 and 6 supply also an additional feature not shown in the arrangement of Figs. 1 and 2 in that a valve inlet branch which may be considered as comprising the valved section 65 and the valved section 66 leads from the lower portion of the lower zone E to the pump 63 with the result that, if desired, there can be obtained a delivery of sludge from the lower zone into the upper zone. Such use may be availed of should an abnormal condition come into existence, as for example should the anaerobic bacteria become depleted or unduly lessened in the upper zone. In such instance the sludge of the lower zone may be returned to the upper zone and be relied upon for "seeding" the sludge in the upper zone and thus reestablish the proper operating conditions in the upper zone.

Under normal operative conditions the lower inlet valved section 66 is closed and the pump recirculation is solely through the inlet branch 62 and the delivery pipe 64.

If sludge is to be withdrawn solely from the bottom of the digester of Figs. 5 and 6, it will be apparent that the valved section 65 and the valve 17 of the discharge pipe 16 will be open, and at this time the valved section 66 should be closed. Except as indicated above, the construction and operation of the arrangements of Figs. 1 and 2 and of Figs. 5 and 6 are identical.

*General*

From what has preceded it will be manifest that according to either form of apparatus, raw or incoming sludge from the digester enters the zone D through the sludge supply pipe or conduit F; that by means of the mixers M an effective intermingling or mixing of the solids of the incoming sludge in and throughout the sludge undergoing the initial anaerobic digestion stage will be effected; that incident to said feeding there will be a corresponding displacement of sludge from the upper zone to and into the lower body of sludge undergoing the second or subsequent stage of anaerobic digestion; that incident to said mixing the quantity of sludge displaced from the upper zone is composed of ingredients or constituents in substantially the same proportion as the sludge in the upper zone; that a substantial sedimentation can take place in the lower zone E and that as a consequence thereof and of said feeding the supernatant in the lower zone E will be automatically passed from the digester as a relatively clarified effluent through the outflow conduit construction G; and that from time to time as required the sedimented solids—which have become relatively inert digestion residues—can be withdrawn from the lower interior portion of the digester.

It will be noted that in both forms or arrangements, the gas created or developed in the lower zone is passed up from the high section thereof ultimately into the gas receiving space which is directly above and which is in part defined, as to the lower confines thereof, by the top surface of the body of sludge in the upper zone.

To one skilled in the art, it is manifest that the multi-stage process can be duly initiated, and that when once initiated and established, the process thereof is continuous and relatively easily carried out.

What is claimed is:

1. A multi-stage digester for sludge containing decomposable organics comprising a relatively gas-tight tank providing a sludge-holding section, having a top member at the underside of which there is a gas-receiving and collecting space immediately over and exposed to the liquid within the sludge-holding section, piping for conducting gas from said space, partitioning means by which the sludge-holding section of the tank is functionally divided into upper and lower digestion zones of which one serves as an initial sludge-digestion zone while the other serves as a subsequent sludge-digestion zone and as to each of which the gas given off as the result of the digesting of sludge therein is ultimately received in said gas-collecting space, feed piping having the discharge end thereof so disposed that sludge supplied therethrough is normally submergedly delivered into the sludge within the initial digesting zone, sludge-transfer means providing a constantly open main sludge-transfer conduit leading from the initial digestion zone to the subsequent digestion zone and comprising upflow and downflow conduit sections in serial arrangement through the medium of which said digestion zones are in constant hydraulic communication, outflow means providing an effluent conduit section of which the inlet end is submergedly disposed with respect to the sludge in the subsequent digestion zone and having an overflow section determining the normal level of the sludge within the sludge-holding section of the tank and being at elevation sufficiently high with respect to the sludge-transfer means as a whole to assure the continuous and uninterrupted extension of the sludge within the tank from the initial digestion zone through said main transfer conduit means to the subsequent digestion zone, sludge withdrawal means leading from the lower portion of the lower digestion zone and provided for the withdrawal at will of sludge from the lower portion of the digester tank, emergency sludge-transfer means providing an auxiliary passageway leading from a low portion of the upper digestion zone to the lower sludge-digestion zone, and a relief valve normally closing said auxiliary passageway against the passage of sludge therethrough except when abnormal conditions exist and cause a substantial pressure differential on opposite sides of said relief valve whereupon it automatically opens to permit a downflow of sludge from the upper digestion zone into the lower digestion zone.

2. A multi-stage digester comprising a tank having superposed closed compartments forming an upper agitation aided sludge digestion zone and a lower quiescent sludge digestion and sedimentation zone, a disc-like partition therebetween, a sludge feed for the upper zone, sludge-stirring means operable in the upper zone adapted to render the sludge in that zone substantially homogeneous for facilitating bacterial digestion thereof, a digested sludge discharge for the lower zone, means for collecting gas from said zones, and an upstanding pipe extending upwardly from said partition and forming a sludge flow path through said partition from the upper section of the agitation aided upper zone for conducting sludge therefrom to the quiescent lower zone by downward displacement of the sludge resulting from new sludge being supplied to the upper zone.

3. A digester according to claim 2 with the additional feature that said pipe at its upper part has a concentric extension therefor.

4. A multi-stage digester comprising a tank having a gas-receiving section; partitioning means dividing said tank into initial and subsequent digestion sections; means for feeding sludge into the initial digestion section; transfer means providing a constantly open main passageway for the passing of sludge therethrough from a locality within the initial digestion section that is substantially above the partitioning means downwardly into the subsequent digestion section; discharge means leading from said subsequent digestion section including a section terminating in an overflow that is at an elevation higher than that of the aforementioned transfer means and a section by which the contents of the subsequent digestion section can be withdrawn therefrom; means providing an auxiliary passageway leading from the lower portion of the initial digestion section to a portion of the subsequent digestion section; and a relief valve for closing said auxiliary passageway except when abnormal conditions cause a substantial pressure differential at opposite sides of the relief valve.

5. A multi-stage substantially gas-tight digester having a transverse diaphragm which divides the digester into upper and lower zones for respectively holding an upper sludge body undergoing an initial bacteriological digestion stage and a lower sludge body undergoing a subsequent bacteriological digestion stage; a sludge supply pipe for said upper zone; a liquid outflow conduit for the lower zone comprising an overflow weir that determines the normal level of the body of sludge within the upper zone whereby a gas-collecting space is left within the digester; sludge transfer means associated with the diaphragm providing a constantly open main passageway leading from a locality of the upper zone which is substantially above the diaphragm downwardly to the lower zone; a baffle member for preventing a short circuit flow of incoming sludge into the sludge transfer means; and a gas withdrawal pipe leading from the upper interior portion of the digester.

6. A sludge-treating apparatus comprising a tank providing a sludge-holding section, partitioning means functionally dividing the sludge-holding section into upper and lower sludge digestion zones of which one serves as an initial digestion zone while the other serves as a subsequent digestion zone, sludge-supply means leading to the initial digesting zone, sludge-transfer means providing a main transfer conduit leading from the initial digestion zone to the subsequent digestion zone and comprising upflow and downflow conduit sections in serial arrangement through the medium of which said digestion zones are in constant hydraulic communication, outflow means providing a section leading from the subsequent digestion zone and having an overflow portion disposed for determining the normal level of the sludge within the sludge-holding section of the tank and at elevation sufficiently high with respect to the sludge-transfer means as a whole to assure a continued extension of the sludge within the tank from the initial digestion zone through said main transfer conduit to the subsequent digestion zone and also providing a section leading from the lower portion of the lower digestion zone and thereby serving for the withdrawal at will of sludge from the lower portion of the digester tank, and emergency sludge-transfer means providing an auxiliary transfer passageway leading from a low portion of the upper digestion zone to the lower digestion zone and having a relief valve normally closing said auxiliary passageway but automatically opening when there is a sufficient differential in pressure at opposite sides thereof.

7. A sludge-treating apparatus comprising a tank providing a sludge-holding section, partitioning means functionally dividing the sludge-holding section into upper and lower digestion zones of which one serves as an initial digestion zone while the other serves as a subsequent digestion zone, sludge-supply means leading to the initial digestion zone, sludge-transfer means providing a main transfer conduit leading from the initial digestion zone to the subsequent digestion zone and comprising a conduit section having extent from a region substantially above the partition to a region at least as low as the underside of the partition and through which said digestion zones are maintained in hydraulic communication, outflow means providing a sediment-withdrawal section communicating with the lower portion of the lower digestion zone and serving for the withdrawing at will of sludge from the lower portion of the digester tank and also providing an effluent section leading from the subsequent discharge zone and having an overflow portion determining the normal level of the sludge within the sludge-holding section of the tank at elevation sufficiently high with respect to the sludge-transfer means as a whole to assure a continued extension of the sludge within the tank from the initial digestion zone through said main transfer conduit to the subsequent digestion zone, and emergency sludge-transfer means providing an auxiliary transfer passageway leading from a low portion of the upper digestion zone to the lower digestion zone and having a relief valve normally closing said auxiliary passageway but automatically opening when there is a sufficient differential in pressure at opposite sides thereof.

FRANK A. DOWNES.